United States Patent
Fons Lluis et al.

(10) Patent No.: US 12,470,500 B2
(45) Date of Patent: Nov. 11, 2025

(54) NETWORK DEVICE AND METHOD FOR SWITCHING, ROUTING AND/OR GATEWAYING DATA

(71) Applicant: Shenzhen Yinwang Intelligent Technologies Co., Ltd., Shenzhen (CN)

(72) Inventors: Francisco Fons Lluis, Munich (DE); Angela Gonzalez Marino, Munich (DE); Ming Li, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 44 days.

(21) Appl. No.: 18/327,029

(22) Filed: May 31, 2023

(65) Prior Publication Data
US 2023/0308400 A1     Sep. 28, 2023

Related U.S. Application Data (63) Continuation of application No. PCT/EP2020/085803, filed on Dec. 11, 2020.

(51) Int. Cl.
| | |
|---|---|
| G06F 15/173 | (2006.01) |
| H04L 9/40 | (2022.01) |
| H04L 47/22 | (2022.01) |
| H04L 49/00 | (2022.01) |
| H04L 49/1546 | (2022.01) |
| H04L 49/90 | (2022.01) |

(52) U.S. Cl.
CPC .......... *H04L 49/1546* (2013.01); *H04L 47/22* (2013.01); *H04L 49/30* (2013.01); *H04L 49/90* (2013.01); *H04L 63/0263* (2013.01)

(58) Field of Classification Search
CPC ......... H04L 47/22; H04L 49/30; H04L 49/90; H04L 63/0263
See application file for complete search history.

(56) References Cited

U.S. PATENT DOCUMENTS

| | | |
|---|---|---|
| 9,252,972 B1 | 2/2016 | Dukes et al. |
| 2014/0133350 A1 | 5/2014 | Triess et al. |
| 2017/0072876 A1 | 3/2017 | Rajan et al. |
| 2019/0141133 A1 | 5/2019 | Rajan et al. |
| 2020/0259765 A1 | 8/2020 | Bosshart et al. |

FOREIGN PATENT DOCUMENTS

| | | |
|---|---|---|
| EP | 3080730 B1 | 2/2021 |

*Primary Examiner* — Joseph R Maniwang
(74) *Attorney, Agent, or Firm* — Leydig, Voit & Mayer, Ltd.

(57) ABSTRACT

A communication network comprises a central processing unit, data ingress ports and data egress ports configured to exchange data with a further network device of the communication network, and a plurality of co-processors that comprises frame normalization co-processors, ingress queuing co-processors, filtering and policing co-processors, intermediate queuing co-processors, a gatewaying co-processor, egress queuing co-processors, and a traffic shaping co-processor. The central processing unit configures and controls the data ingress ports, the data egress ports, and the plurality of co-processors to implement data processing paths in parallel or in a pipeline between the ingress ports and the egress ports.

7 Claims, 7 Drawing Sheets

NETWORK DEVICE AND METHOD FOR SWITCHING, ROUTING AND/OR GATEWAYING DATA

CROSS-REFERENCE TO RELATED APPLICATIONS

This application is a continuation of International Application PCT/EP2020/085803, filed on Dec. 11, 2020, the disclosure of which is hereby incorporated by reference in its entirety.

TECHNICAL FIELD

In general, the present invention relates to communication networks. More specifically, the present invention relates to devices and methods for switching, routing and/or gatewaying data among different subnetworks of a communication network.

BACKGROUND

Network gatewaying is, by nature, a complex and demanding processing task, especially in the automotive field where many heterogeneous in-vehicle network technologies and protocols coexist, for example, CAN 2.0, CAN FD, LIN, FlexRay, or Ethernet.

Software-based approaches for network gatewaying, despite a de facto option today, may not be the best choice to guarantee real-time performance, particularly in terms of latency, jitter, bandwidth and/or throughput for next-generation autonomous-driving vehicles.

In light of above, there is a need for an improved device and method for switching, routing and/or gatewaying data among different subnetworks of a communication network in an efficient manner.

SUMMARY

It is an object of the invention to provide an improved network device and method for switching, routing and/or gatewaying data among different subnetworks of a communication network in an efficient manner.

The foregoing and other objects are achieved by the subject matter of the independent claims. Further implementation forms are apparent from the dependent claims, the description and the figures.

Generally, embodiments of the invention relate to a novel concept of an efficient communication gatewaying method and device. That is, embodiments of the invention enable an efficient design and development of a complete building methodology via hardware/software codesign to synthesize a communication gateway as a functional product.

Further, as outcome of this methodology, the resultant physical gateway device is responsible for performing a full set of communication features, mainly the forwarding, encapsulation and related processing of Protocol Data Units (PDUs) or data frames among different networks of a given networking infrastructure, and fulfilling also another set of requirements related to reliability or functional safety and also cyber security, being all the required algorithms embedded and performed inside such a gateway device.

Embodiments of the invention are suitable and deployable across many industries and use cases: from generic information and communication technology or enterprise networks to smart manufacturing networks, Internet of things (IoT) networks or even automotive in-vehicle networks.

More specifically, according to a first aspect the invention relates to a network device for switching, routing and/or gatewaying data among different subnetworks of a communication network, wherein the network device comprises: a central processing unit; one or more data ingress ports and one or more data egress ports; and a plurality of co-processors. The one or more data ingress ports and the one or more data egress ports are configured to exchange data with a further network device of the communication network, and the plurality of co-processors comprises one or more frame normalization co-processors, one or more ingress queuing co-processors, one or more filtering and policing co-processors, one or more intermediate queuing co-processors, at least one gatewaying co-processor, one or more egress queuing co-processors and at least one traffic shaping co-processor, wherein the central processing unit is adapted to configure and control the one or more data ingress ports, the one or more data egress ports and the plurality of co-processors to implement one or more data processing paths in parallel and/or in a pipeline between the one or more ingress ports and the one or more egress ports.

In light of the above, an improved network device is hence provided, allowing for switching, routing and/or gatewaying data among the different subnetworks of the communication network efficiently.

In a further possible implementation form of the first aspect, the one or more ingress ports and the one or more egress ports are based on heterogeneous network technologies including at least two of LIN, CAN 2.0, CAN-FD, CAN-XL, FlexRay, 10Base-T1S, 100Base-T1, 100Base-T, 1000Base-T1, 1000Base-T and/or 10 GBase-T. Advantageously, this allows for efficient and network/protocol-independent data processing between the ingress ports and the egress ports.

In a further possible implementation form of the first aspect, each of the one or more frame normalization co-processors is configured to convert one or more ingress frames of a given network technology into one or more normalized data link layer frames, wherein a normalized data link layer frame is a network technology-independent and/or protocol-independent data link layer frame structured as a stream of bits comprising a frame header, a frame payload and a frame trailer. Advantageously, this allows for efficient, more abstract and less complex data processing between the ingress ports and the egress ports.

In a further possible implementation form of the first aspect, each of the one or more frame normalization co-processors may be further configured to check the integrity of the whole data link layer frame. Advantageously, this ensures the integrity of the data link layer frame.

In a further possible implementation form of the first aspect, each of the one or more frame normalization co-processors is configured to convert one or more ingress frames into a stream of bits organized in a set of information fields, being each of these fields of a particular length and codified with a particular meaning according to the given network technology and/or protocol to which the ingress frame belongs to, including LIN, CAN 2.0, CAN-FD, CAN-XL, FlexRay, 10Base-T1S, 100Base-T1, 100Base-T, 1000Base-T1, 1000Base-T and/or 10GBase-T. Advantageously, this allows for efficient, more abstract and less complex data processing between the ingress ports and the egress ports.

In a further possible implementation form of the first aspect, each of the one or more ingress queuing co-processors comprises a memory, in particular a FIFO memory, configured to buffer the one or more data link layer frames, in particular one or more data link layer frames generated by the one or more frame normalization co-processors. Advantageously, this allows for buffering the data link layer frames more efficiently.

In a further possible implementation form of the first aspect, each of the one or more filtering and policing co-processors is configured to parse the frame header and/or the frame payload of the one or more data link layer frames based on one or more matching rules and/or one or more regular expression searches, and filtering, policing and classifying the one or more data link layer frames based on the one or more matching rules and/or the one or more regular expression searches. Advantageously, this allows for converting the ingress frames into normalized data link layer frames that are pattern matched against a set of rules and/or signatures more efficiently.

In a further possible implementation form of the first aspect, each of the one or more filtering and policing co-processors is further configured to implement a security firewall and/or a network intrusion detection system applied on each of the one or more data link layer frames. Advantageously, this allows for converting the ingress frames into normalized data link layer frames that are pattern matched against a set of rules and/or signatures in an efficient and secure manner.

In a further possible implementation form of the first aspect, each of the one or more filtering and policing co-processors is configured to process the frame header and/or the payload of the one or more data link layer frames in a parallel mode and/or in a pipeline mode. Advantageously, this allows for converting the ingress frames into normalized data link layer frames that are pattern matched against a set of rules and/or signatures more efficiently.

In a further possible implementation form of the first aspect, each of the one or more intermediate queuing co-processors comprises a memory, in particular a FIFO memory, configured to buffer the one or more filtered data link layer frames filtered by the one or more filtering and policing co-processors. Advantageously, this allows for buffering the data link layer frames filtered by the one or more filtering and policing co-processors more efficiently.

In a further possible implementation form of the first aspect, the at least one gatewaying co-processor is further configured to perform any related action linked to any given positive matching operation performed by the filtering and policing coprocessor on each data link layer frame, including an alert triggering operation, a frame forwarding operation, a frame routing operation, a frame cut-through switching operation, a frame replication operation, a frame elimination operation, a frame encryption/decryption operation, a frame compression/decompression operation, a frame encapsulation/decapsulation operation, a frame tunnelling operation, and/or a frame aggregation operation, and/or wherein the at least one gatewaying co-processor is configured to generate a new data link layer frame.

In a further possible implementation form of the first aspect, the at least one gatewaying co-processor is configured to apply one or more gatewaying and/or routing and/or switching operations to the one or more filtered data link layer frames in a parallel mode and/or in a pipeline mode. Advantageously, this allows for gatewaying, routing, and switching the data link layer frames more efficiently.

In a further possible implementation form of the first aspect, each of the one or more egress queuing co-processors comprises a memory, in particular a FIFO memory, configured to buffer the one or more data link layer frames provided by the at least one gatewaying co-processor. Advantageously, this allows for buffering the data link layer frames provided by the at least one gatewaying co-processor more efficiently.

In a further possible implementation form of the first aspect, the at least one traffic shaping co-processor is configured to control the provisioning of the one or more data link layer frames to the one or more egress ports. Advantageously, this allows for provisioning the data link layer frames more efficiently.

In a further possible implementation form of the first aspect, the at least one traffic shaping co-processor is configured to perform any frame shaping related action on each data link layer frame per egress port, including a time aware shaping operation, a credit-based shaping operation, an asynchronous traffic shaping operation, a cyclic queueing shaping operation and/or a frame pre-emption operation. Advantageously, any frame shaping related action can be performed for each date link layer frame efficiently.

In a further possible implementation form of the first aspect, the at least one traffic shaping co-processor is configured to apply one or more traffic shaping operations to the one or more filtered data link layer frames in a parallel mode and/or in a pipeline mode. Advantageously, any frame shaping related action can be performed for each data link layer frame efficiently.

In a further possible implementation form of the first aspect, the network device further comprises a communication bus and wherein the central processing unit is configured to communicate with the plurality of co-processors via the communication bus for implementing a control path through which it is possible to exchange instruction frames. Advantageously, this allows for an efficient communication between the central processing unit and the plurality of co-processors.

In a further possible implementation form of the first aspect, for each of the one or more data link layer frames the plurality of co-processors are configured to exchange an instruction frame via the communication bus, wherein the instruction frame comprises one or more commands for processing the respective data link layer frame and wherein the communication bus is configured to provide the respective instruction frame to the respective co-processor synchronously with the respective data link layer frame. Advantageously, this allows for an efficient communication among the plurality of co-processors and enables the plurality of co-processors to process the data link layer frame efficiently.

In a further possible implementation form of the first aspect, each data link layer frame which moves internally across the network device, is processed by the plurality of co-processors from a data plane, while, in its turn, in parallel and at the same time, its associated instruction frame is handled from a control plane, moving from one coprocessor stage to the next coprocessor stage synchronously to the movement, back and forth, of its related data link layer frame. Advantageously, this allows for an efficient processing of the data link layer frame and an efficient management of the corresponding instruction frame.

In a further possible implementation form of the first aspect, the control plane of the network device is implemented by the central processing unit and/or a finite state machine, FSM, and/or an arithmetic logic unit, ALU, implemented in hardware inside the one or more co-processors from the data plane as distributed controllers of the control plane responsible for executing the instruction frame associated to each data link layer frame that moves across the data plane. Advantageously, this allows for an efficient management of the instruction frame.

In a further possible implementation form of the first aspect, each data link layer frame moving through the data plane across the plurality of co-processors has an associated instruction frame that moves through the control plane. Advantageously, this allows for an efficient processing of the data link layer frame and an efficient management of the corresponding instruction frame.

In a further possible implementation form of the first aspect, each instruction frame comprises a header, a payload and a trailer, organized in a set of fields and commands to instruct the one or more co-processors of the data plane about one or more operations to be performed. Advantageously, this allows for an efficient management of each instruction frame.

In a further possible implementation form of the first aspect, each instruction frame associated to a data link layer frame comprises information fields which contain metadata of the data link layer frame, including at least one of the following: a port number, a network type, an ingress frame timestamp, a frame length, a frame priority, a number of rules matched, one or more commands and one or more command parameters. Advantageously, this allows for an efficient management of each instruction frame.

In a further possible implementation form of the first aspect, the data link layer frame provided by the filtering and policing co-processor is forwarded to the one or more intermediate queueing co-processors and/or back to the one or more ingress queueing co-processors. Advantageously, this allows for iterations with different stages of processing for the data link layer frame.

In a further possible implementation form of the first aspect, the data link layer frame provided by the one or more gatewaying co-processors is forwarded to the one or more egress queueing co-processors, and/or back to the one or more intermediate queueing co-processors, and/or back to the one or more ingress queueing co-processors. Advantageously, this allows for iterations with different stages of processing for the data link layer frame.

In a further possible implementation form of the first aspect, the data link layer frame provided by the one or more traffic shaping co-processors is forwarded to the one or more egress ports, and/or back to the one or more intermediate queueing co-processors, and/or back to the one or more ingress queueing co-processors. Advantageously, this allows for iterations with different stages of processing for the data link layer frame.

In a further possible implementation form of the first aspect, the reading and writing ports of the ingress queues, intermediate queues and egress queues have the same or different clock frequencies, allowing thus different clock domains in the data path of the frames flowing from ingress ports to egress ports through the normalization, filtering and policing, gatewaying and traffic shaping co-processors.

In a further possible implementation form of the first aspect, the network device is an automotive gateway electronic control unit. Thus, an improved automotive gateway electronic control unit is provided, allowing for optimization of the processing latency, jitter, bandwidth and/or throughput of data and switching, routing and/or gatewaying data among different subnetworks of a communication network efficiently.

According to a second aspect, the invention relates to a method of providing a network device for switching, routing and/or gatewaying data among different subnetworks of a communication network, wherein the method comprises the following steps: providing a central processing unit; providing one or more data ingress ports and one or more data egress configured to exchange data with a further network device of the communication network; and providing a plurality of co-processors, wherein the plurality of co-processors comprises one or more frame normalization co-processors, one or more ingress queuing co-processors, one or more filtering and policing co-processors, one or more intermediate queuing co-processors, at least one gatewaying co-processor, one or more egress queuing co-processors and at least one traffic shaping co-processor, wherein the central processing unit is responsible for configuring and controlling the one or more data ingress ports, the one or more data egress ports and the plurality of co-processors to implement one or more data processing paths in parallel and/or in pipeline between the one or more ingress ports and the one or more egress ports.

Thus, an improved method is hence provided, allowing a network device for switching, routing and/or gatewaying data among the different subnetworks of the communication network efficiently.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

The engineering effort required to develop an automotive gateway electronic control unit (ECU), i.e., hardware/software codesign, cannot be underestimated: a big team of several tens of hardware, software and system engineers working together for a long time, normally not less than one or two years, is required to cover a full product development cycle, from an abstract concept to design and development, verification and validation and finally to start-of-production.

A state-of-the-art gateway design is mainly based on a software implementation guided by, for example, the AUTOSAR architecture. However, the approach based on software, despite de facto solution today, probably is not the best choice anymore with regard to autonomous driving (AD) solutions, particularly in terms of latency, performance, reliability and functional safety for next-generation L3-to-L5 autonomous driving vehicles.

In contrast, hardware-driven gatewaying alternatives can offer many advantages. In the automotive industry, some original equipment manufacturers (OEMs) or Tier-1 suppliers have already realized this opportunity. Other solutions can be based on specific hardware architectures and hardware accelerators combined with software CPU cores.

Nowadays, there exist a technology called Software Defined Network (SDN) that propels the synthesis of networking functions in hardware based on its description in software. Moreover, a programming language called P4 has been developed for such aim, with which it is possible to deploy a certain number of networking algorithms or use cases, although not everything yet.

Although the Software Defined Network (SDN) is a powerful design strategy to implement networking systems, the level of abstraction dealing only with the three programmable blocks, i.e., parser, match-action and deparser, is not enough to implement a real gateway electronic control unit for the automotive industry which can meet the full set of requirements. In other words, such level of abstraction is too high to achieve such a challenging product with the right level of controllability of the design steps and delivering the expected level of accuracy on the target key performance indicators (KPIs).

In this regard, there is a need for an alternative approach for switching, routing and/or gatewaying data among different subnetworks of a communication network in an efficient manner.

As will be seen in more detail in the following, embodiments of the invention are described in the context of the automotive technology, providing an innovative way of building future automotive gateway electronic control units (ECUs). The most relevant singularity of automotive in-vehicle networks compared with other industrial networks may be the fact that in the automotive field many different types of network technologies coexist, for example, the recently adopted automotive ethernet 100Base-T1, 1000Base-T1 or other legacy buses such as CAN 2.0, CAN-FD, LIN, FlexRay. The method, device and system developed according to the embodiments here can be applied to a specific computing unit or semiconductor device synthesized in silicon that becomes a processing core of the gateway electronic control unit, typically a System-on-Chip (SoC) or Microcontroller Unit (MCU).

An automotive zonal electrical/electronic (EE) architecture is composed of electronic control units (ECUs) distributed physically across the mechanical chassis or infrastructure of a vehicle and split in high performance computers (HPC) and zonal gateways (ZGW), all interconnected through heterogeneous in-vehicle networks.

In this regard, gatewaying is, by nature, a complex and highly demanding processing computational task, especially in the automotive field where many heterogenous network technologies and protocols coexist. The gateway module takes charge of receiving and sending frames from ingress to egress ports by encapsulating, aggregating, tunneling and/or processing protocol data units (PDUs) or data frames according to networking and transport protocol instructions and standards, in line with the network open systems interconnection (OSI) model decomposed in layers.

An ideal gateway processing consists in performing the adaptation of protocol data units (PDUs) from one network to another but minimizing the effects of this transformation, i.e., minimizing the latency of such processing when moving PDUs from ingress ports to egress ports of the gateway according to the switching/routing mechanisms in place.

Many of these tasks performed by the gateway ECU are time-consuming tasks, for instance the protocol conversion and data encapsulation from one network to another (e.g., IEEE 1722 standard for LIN, CAN, FlexRay over Ethernet).

The task of designing a gateway device involves dealing with and fulfilling a large collection of standards and requirements. In the particular case of the automotive industry, any automotive-qualified gateway ECU must accomplish specifications from different technical perspectives, such as performance (KPIs concerning number of connections, types of networks, bandwidth, latency, jitter), configurability (SDN), time sensitive networking (TSN) standards, cyber security measures, and functional safety requirements.

Embodiments of the invention offer a new methodology to build physical gateway ECUs embedding a set of functionalities required and specified by the user through the hardware/software codesign of such functions. In such way, part of this functionality is implemented in software to run on a CPU and the other part is synthesized in hardware in the way of co-processors, peripherals or hardware engines interconnected to the system-on-chip or microcontroller where the full gateway ECU application is integrated.

As will be described in more detail in the following, in particular under reference to FIGS. 1 and 2, embodiments of the invention provide a gateway architecture that is oriented to exploit both hardware parallelism and pipelining strategies, based on a sequential and ultrafast ingress-to-egress data path, targeting to optimize the processing latency of every frame.

Figure 1:
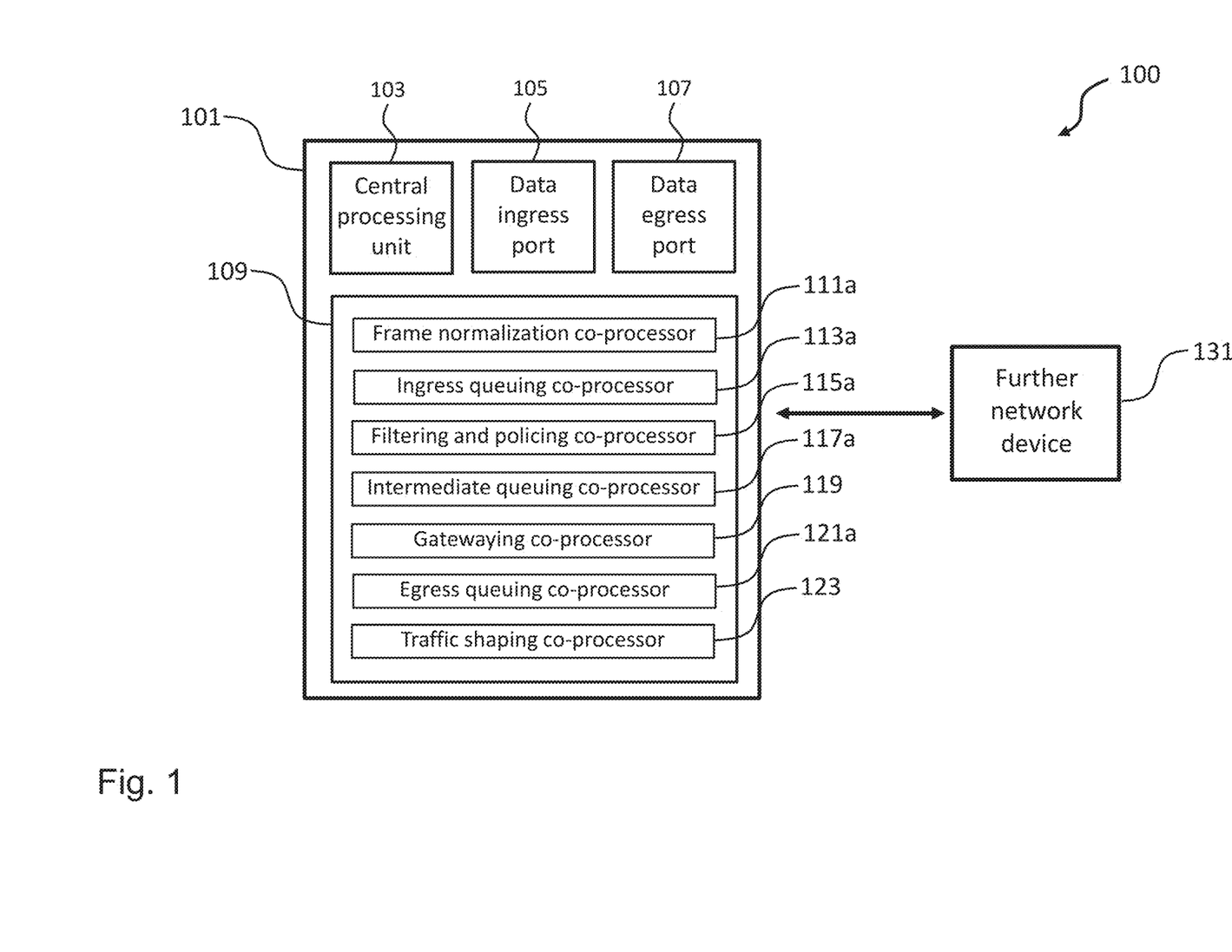
FIG. 1 is a schematic diagram illustrating an exemplary communication network 100 which comprises a network device 101 and a further network device 131 according to an embodiment.

FIG. 1 is a schematic diagram illustrating an exemplary communication network 100 which comprises a network device 101 and a further network device 131 according to an embodiment, wherein the network device 101 is configured to switch, rout and/or gateway data among different subnetworks of the communication network 100. In an embodiment, the network device 101 is an automotive gateway electronic control unit.

As can be taken from a detailed view in FIG. 1, the network device 101 comprises a central processing unit 103, one or more data ingress ports 105a, one or more data egress ports 107a and a plurality of co-processors 109. In an embodiment, the central processing unit 103 is adapted to configure and control the one or more data ingress ports 105a, the one or more data egress ports 107a and the plurality of co-processors 109 to implement one or more data processing paths in parallel and/or in a pipeline between the one or more ingress ports 105a and the one or more egress ports 107a.

In a further embodiment, the network device 101 further comprises a communication bus and the central processing unit 103 is configured to communicate with the plurality of co-processors 109 via the communication bus for implementing a control path through which it is possible to exchange instruction frames as metadata linked to every single data frame.

Further, the one or more data ingress ports 105a and the one or more data egress ports 107a are configured to exchange data with the further network device 131 of the communication network 100. In an embodiment, the one or more ingress ports 105a and the one or more egress ports 107a are based on heterogeneous network technologies including at least one or two of LIN, CAN 2.0, CAN-FD, CAN-XL, FlexRay, 10Base-T1S, 100Base-T1, 100Base-T, 1000Base-T1, 1000Base-T and/or 10GBase-T.

As can be taken from a further detailed view in FIG. 1, the plurality of co-processors 109 comprises one or more frame normalization co-processors 111a, one or more ingress queuing co-processors 113a, one or more filtering and policing co-processors 115a, one or more intermediate queuing co-processors 117a, at least one gatewaying co-processor 119, one or more egress queuing co-processors 121a and at least one traffic shaping co-processor 123. The functionalities of these co-processors will be further discussed in detail below.

In an embodiment, each of the one or more frame normalization co-processors 111a is configured to convert one or more ingress frames of a given network technology into one or more normalized data link layer frames, wherein a normalized data link layer frame is a network technology-independent and/or protocol-independent data link layer frame structured as a stream of bits comprising a frame header, a frame payload and a frame trailer. Further, each of the one or more frame normalization co-processors 111a may be further configured to check the integrity of the whole data link layer frame.

In a further embodiment, each of the one or more frame normalization co-processors 111a is configured to convert one or more ingress frames into a stream of bits organized in a set of information fields, being each of these fields of a particular length and codified with a particular meaning according to the given network technology and/or protocol to which the ingress frame belongs to, including LIN, CAN 2.0, CAN-FD, CAN-XL, FlexRay, 10Base-T1S, 100Base-T1, 100Base-T, 1000Base-T1, 1000Base-T and/or 10GBase-T.

After generation of the one or more data link layer frames, each of the one or more filtering and policing co-processors 115a is configured to parse the frame header and/or the frame payload of the one or more data link layer frames based on one or more matching rules and/or one or more regular expression searches. Each of the one or more filtering and policing co-processors is configured to process the frame header and the payload of the one or more data link layer frames in a parallel mode and/or in a pipeline mode.

In a further embodiment, each of the one or more filtering and policing co-processors is configured to filter, police and classify the one or more data link layer frames based on the one or more matching rules and/or the one or more regular expression searches. In another embodiment, each of the one or more filtering and policing co-processors is further configured to implement a security firewall and/or a network intrusion detection system applied on each of the one or more data link layer frames.

In a further embodiment, the at least one gatewaying co-processor 119 is configured to perform any related action linked to any given positive matching operation performed by the filtering and policing co-processor on each data link layer frame, including an alert triggering operation, a frame forwarding operation, a frame routing operation, a frame cut-through switching operation, a frame replication operation, a frame elimination operation, a frame encryption/decryption operation, a frame compression/decompression operation, a frame encapsulation/decapsulation operation, a frame tunneling operation, and/or a frame aggregation operation.

In a further embodiment, the at least one gatewaying co-processor 119 is configured to apply one or more gatewaying and/or routing and/or switching operations to the one or more filtered data link layer frames in a parallel mode and/or in a pipeline mode. Besides, the at least one gatewaying co-processor 119 is configured to generate a new data link layer frame.

In order to buffer the one or more data link layer frames at different stages of their data processing paths, according to an embodiment, each of the one or more ingress queueing co-processors 113a comprises a memory configured to buffer the one or more data link layer frames, in particular, generated by the one or more frame normalization co-processors. Likewise, each of the one or more intermediate queuing co-processors 117a comprises a memory configured to buffer the one or more filtered data link layer frames filtered by the one or more filtering and policing co-processors 115a, and also each of the one or more egress queuing co-processors 121a comprises a memory configured to buffer the one or more data link layer frames provided by the at least one gatewaying co-processor 119.

In this regard, the data link layer frame provided by the filtering and policing co-processor 115a is forwarded to the one or more intermediate queueing co-processors 117a and/or back to the one or more ingress queueing co-processors 113a according to an embodiment. Further, the data link layer frame provided by the one or more gatewaying co-processors 119 is forwarded to the one or more egress queueing co-processors 121a, and/or back to the one or more intermediate queueing co-processors 117a, and/or back to the one or more ingress queueing co-processors 113a. Also, the data link layer frame provided by the one or more traffic shaping co-processors 123 is forwarded to the one or more egress ports 121a, and/or back to the one or more intermediate queueing co-processors 117a, and/or back to the one or more ingress queueing co-processors 113a.

In an embodiment, the memory of each of the one or more ingress queueing co-processors 113a or/and each of the one or more intermediate queuing co-processors 117a or/and each of the one or more egress queuing co-processors 121a can be a FIFO memory.

In a further embodiment, the presence of three queueing stages (i.e. performed by the one or more ingress queuing co-processors, the one or more intermediate queuing co-processors and the one or more egress queuing co-processors) inside the network device 101 allows to have up to three different internal clock domains or processing speeds: one going from ingress ports to ingress queues, another going from ingress queues to intermediate queues and the last one going from intermediate queues to egress ports.

Finally, the at least one traffic shaping co-processor 123 is configured to control the provisioning of the one or more data link layer frames to the one or more egress ports 107a. In an embodiment, the at least one traffic shaping co-processor 123 is configured to perform any frame shaping related action on each data link layer frame per egress port, including a time aware shaping operation, a credit-based shaping operation, an asynchronous traffic shaping operation, a cyclic queueing shaping operation and/or a frame pre-emption operation. The at least one traffic shaping co-processor 123 is configured to apply one or more traffic shaping operations to the one or more filtered data link layer frames in a parallel mode and/or in a pipeline mode.

As already mentioned above, the central processing unit 103 of the network device 101 is configured to communicate with the plurality of co-processors 109 via a communication bus. For each of the one or more data link layer frames, the plurality of co-processors 109 are configured to exchange an instruction frame via the communication bus according to an embodiment, wherein the instruction frame comprises one or more commands for processing the respective data link layer frame and wherein the communication bus is configured to provide the respective instruction frame to the respective co-processor synchronously with the respective data link layer frame.

Moreover, each data link layer frame which moves internally across the network device 101, is processed by the plurality of co-processors 109 from a data plane, while, in its turn, in parallel and at the same time, its associated instruction frame is handled from a control plane, moving from one coprocessor stage to the next coprocessor stage synchronously to the movement, back and forth, of its related data link layer frame.

In an embodiment, the control plane of the network device is implemented by the central processing unit 103 and/or a finite state machine, FSM, and/or an arithmetic logic unit, ALU, implemented in hardware inside the one or more co-processors from the data plane as distributed controllers of the control plane responsible for executing the instruction frame associated to each data link layer frame that moves across the data plane. In an embodiment, each data link layer frame moving through the data plane across the plurality of co-processors has an associated instruction frame that moves through the control plane, storing such instruction frame some metadata or commands for the related data frame.

In a further embodiment, each instruction frame comprises a header, a payload and a trailer, organized in a set of fields and commands to instruct the one or more co-processors of the data plane about one or more operations to be performed. Besides, each instruction frame associated to a data link layer frame comprises information fields which contain metadata of the data link layer frame, including at least one of the following: a port number, a network type, an ingress frame timestamp, a frame length, a frame priority, a number of rules matched, one or more commands and one or more command parameters.

Figure 2:
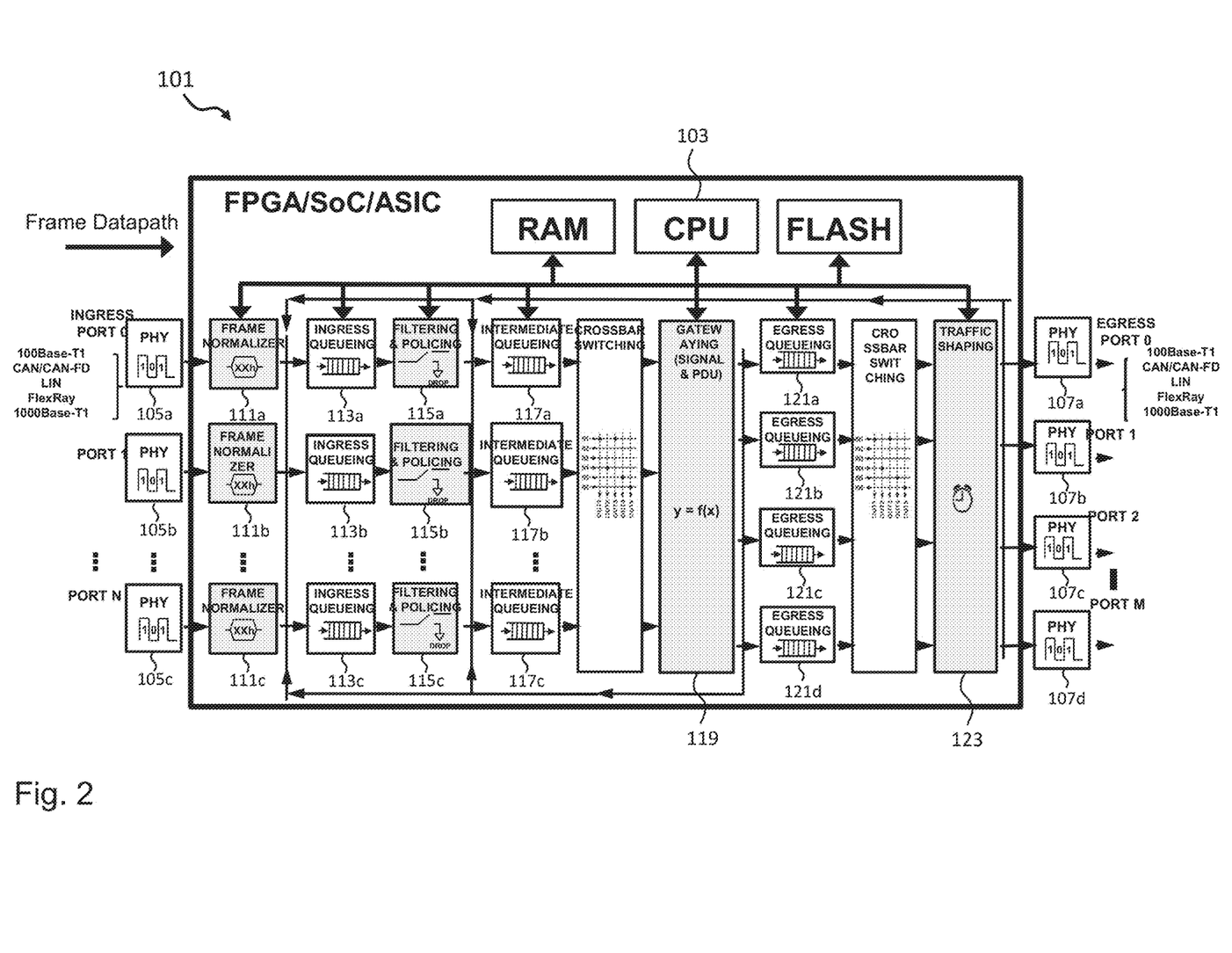
FIG. 2 is a schematic diagram of an exemplary network device 101 which is illustrated as a gateway electronic control unit according to an embodiment.

FIG. 2 is a schematic diagram of an exemplary network device 101 which is illustrated as an automotive gateway electronic control unit (ECU) according to an embodiment based on hardware/software partitioning techniques where the most time critical operations or functions can be deployed in hardware by means of dedicated and reconfigurable coarse-grained functional blocks.

As can be taken from a detailed view in FIG. 2, the network device 101 comprises a central processing unit 103, one or more data ingress ports 105a-c, one or more frame normalization co-processors 111a-c, one or more ingress queuing co-processors 113a-c, one or more filtering and policing co-processors 115a-c, one or more intermediate queuing co-processors 117a-c, at least one gatewaying co-processor 119, one or more egress queuing co-processors 121a-d, at least one traffic shaping co-processor 123, and one or more data egress ports 107a-d. The functionalities of the central processing unit 103, the various co-processors as well as the data ingress or egress ports are already discussed in detail above.

Advantageously, embodiments of the invention fill the detected design gap of network and communication and computation systems by developing a new methodology which, although originally inspired by the Software Defined Network (SDN), goes somehow beyond the SDN in terms of offering better level of design granularity and accuracy, taking thus the design methodology of such kind of complex networking systems and products to the next level.

In an embodiment, a library of specific hardware components or primitives responsible for performing an extensive set of communication functions typically demanded in this type of networking products, i.e., switch, router, gateway or the like is built. This set of functions are primarily developed in hardware instead of software, aimed at offloading thus the system central processing unit (CPU) of the System-on-Chip (SoC) or Microcontroller Unit (MCU), while guaranteeing better level of performance, especially in terms of latency, jitter, bandwidth and throughput.

Moreover, the set of library components is highly configurable by means of a set of design parameters. For such a reason, a set of standard coarse-grained building blocks is provided, in the way that they keep flexible but at the same time can be reconfigured in an extremely short period of time and on the fly (i.e., at run-time, without stopping the execution of the system). All these building blocks provided in the library synthesize all the functionality expected in an automotive gateway electronic control unit (ECU).

Apart from the novelty on design methodology, embodiments of this invention focus also on the system approach. At system level, embodiments of this invention provide a reduced set of building blocks that enable to allocate practically the full set of standards nowadays demanded in an automotive gateway ECU, from three main design pillars: high-performance (latency), functional safety (reliability, fail operational) and cyber security (protection against attacks), as illustrated in Table 1 below.

TABLE 1

Typical standards any automotive GW ECU must be compliant with

| Network OSI Layer | Standard |
|---|---|
| Network L5-L7 | Statefull Packet Inspection (Cyber Security) |
| | Deep Packet Inspection (Cyber Security) |
| | ISO 26262 (Functional Safety) |
| | ISO 21448 (Functional Safety) |
| Network L4 | IEEE 1722 (Performance) |
| | Firewall L4 (Cyber Security) |
| | IDS (Cyber Security) |
| Network L3 | Firewall L3 (Cyber Security) |
| | IDS (Cyber Security) |
| Network L2 | TSN standards: 802.1AS, 802.1CB, 802.1AE, 802.Qci, 802.Qbv, etc. (Performance) |
| | Firewall L2 (Cyber Security) |

Based on this approach, the design of a target gateway ECU can be customized by instantiating the full set of components to build the required geometry and taxonomy in terms of ingress and egress ports and functions/features inside.

The gateway architecture according to embodiments of the invention is oriented to exploit both hardware parallelism and pipelining strategies, based on a sequential and ultrafast ingress-to-egress data path, targeting to optimize the processing latency of every frame.

As shown in in FIG. 2, the functional architecture of the gateway electronic control unit (ECU) in this embodiment can be decomposed, at a first level of abstraction, into a sequence of processing stages, apart from the CPU interaction, giving rise to a data path for the frames from ingress to egress ports: frame normalization; ingress queueing; filtering and policing; intermediate queueing; gatewaying; egress queueing; traffic shaping.

In comparison to the software defined network (SDN) as aforementioned, the number of different components or building blocks is notoriously higher in the embodiments of the invention than in the SDN which consists only of three elements or processing stages: parser, matching-action engine and deparser. This is a key differentiation in order to achieve the level of controllability and accuracy that the gateway ECU of the embodiment requires.

At a second level of abstraction, the building blocks of the gateway device can be decomposed in a further set of functional blocks in order to deploy the complete list of standards and protocols detailed in Table 1. These second level of flexible and reconfigurable coarse-grained building blocks are also part of the library detailed in the methodology to create a gateway device based on a modular and reusable design.

In an embodiment, this data path and the set of functions shown in FIG. 2 are the right building blocks needed to compose whatever automotive gateway that any original equipment manufacturer (OEM) could demand. The state-of-the-art approaches do not have any solution to take into consideration the full set of standards detailed in Table 1 to compose a gateway device, and this hole is nowadays covered implementing most of the required functions and standards directly in software executed by the system CPU.

The functions embedded in the main hardware blocks, i.e., co-processors, that compose the full data path of the gateway electronic control unit (ECU) as shown in FIG. 2 are detailed as follows:

Frame normalization: This block or co-processor is responsible for normalizing the ingress frame so that it is seen internally as a OSI layer 2 standard frame, invariant to/independent of its network nature or protocol (e.g., LIN, CAN 2.0, CAN-FD, FlexRay, 100BaseT1, 1000BaseT1), i.e., a simple stream of bits organized in a set of data fields where every field has a particular meaning. Thus, this functional block is able to process frames of whatever kind by interpreting them as a sequence of data fields or words with a particular meaning depending on its internal codification based on its type of network/protocol.

It is to be noted that the role of this functional block is to convert an ingress data frame into a normalized frame that is network/protocol independent; that is, a stream of bits without caring about whether it corresponds to an Ethernet frame or a CAN frame. This is a strategic aspect of the design because it allows for an abstract solution, making it invariant to the network protocol and covering thus many types of products, for instance enterprise routers that only deal with Ethernet ports and also automotive gateways that deal with heterogeneous ports like Ethernet, CAN, LIN, etc. at the same time, all processed by the same physical device by configuring it accordingly. Apart from that, new types of networks still in development or to come in the future can be integrated into this solution without affecting any hardware change since this abstraction level lets handle it at configuration level.

Ingress queueing: A FIFO memory is used as buffering between the frame normalization stage and the next processing stage. From the architectural perspective, this queue allows to create two different clock domains or processing stages running at different speeds, one for writing and another for reading.

Filtering & policing: This block or co-processor is responsible for performing filtering, classification and monitoring actions on the ingress frames basically based on a rules-based matching engine for both header and payload of the frame. This matching process is shared in many of the operations performed in a gateway device: from frames filtering to the execution of a security firewall and/or an intrusion detection system, or even the routing matrix operation.

During both filtering & policing and gatewaying stages, many time sensitive networking (TSN) standards in hardware as well as many other standards (e.g., cyber security, functional safety, high performance, etc.) are deployed through dedicated tasks or functional blocks allocated inside those two co-processors, i.e. the filtering and policing co-processor and the gateway co-processor.

Intermediate queueing: A FIFO memory is used as buffering between the filtering & policing stage and the next processing stage. From the architectural perspective, this queue allows to create two different clock domains or processing stages running at different speeds, one for writing and another for reading.

Gatewaying: This block or co-processor is responsible for performing most of the gatewaying actions of the gateway electronic control unit (ECU), from TSN standards, to filtering and policing actions, frame generator or encapsulation/aggregation and gatewaying of frames, among many others.

Egress queueing: A FIFO memory is used as buffering between the filtering & policing stage and the next processing stage. From the architectural perspective, this queue allows to create two different clock domains or processing stages running at different speeds, one for writing and another for reading.

Traffic shaping: this block or co-processor is responsible for the arbitration of the egress frames based on different policies or priorities, e.g., time-aware shaping or credit-based shaping.

At architectural level, all these functional blocks or co-processors are constituted by the same type of input/output interface. This feature brings major flexibility in order to compose systems because some of these components can be added or removed just by connecting/removing the interconnections to/from the previous and posterior blocks in the chain, just without affecting or minimizing the integration effort when modifying certain geometrical or functional aspects of the automotive gateway electronic control unit (ECU) in terms of scalability.

Moreover, in order to standardize the computation of the different internal stages of the automotive gateway electronic control unit (ECU), embodiments provide a new gateway processing protocol through the definition of a command or instruction. The format of this command is based on a control frame composed of instruction fields or metadata distributed through header, payload and trailer that are shifted from a coarse-grained building block to the next one in the data path. The header collects global information of the command while the payload refers to specific parameters related to every processing stage. Finally, the trailer of command frame provides the integrity check of the frame through the checksum computation.

The internal control frame is handled through a control bus that is shifted through the different modular processing stages of the gateway in parallel and synchronously to every network or data frame. The command follows a new internal gateway processing protocol defined by means of data fields in the following terms illustrated in FIG. 3.

Figure 3:
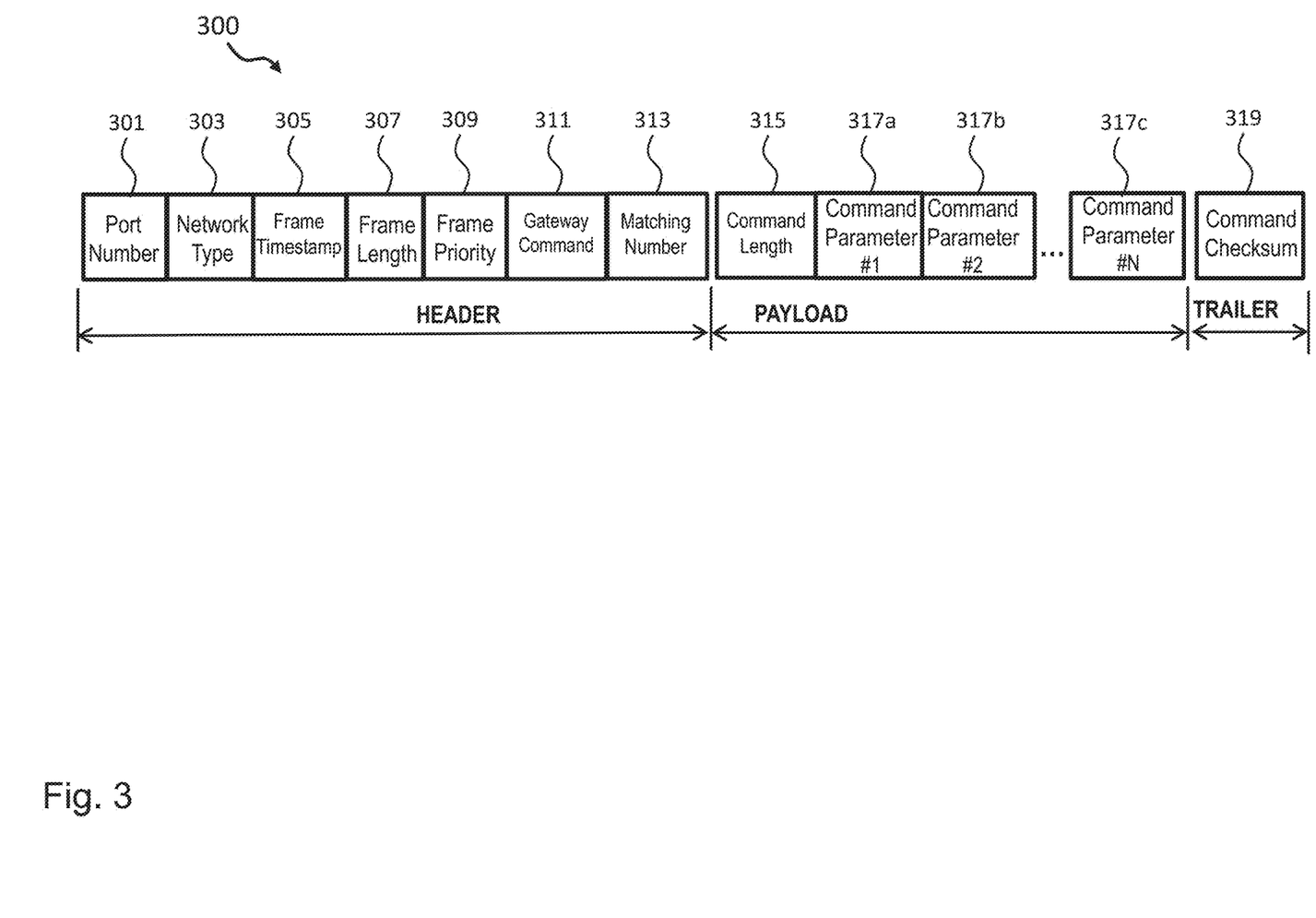
FIG. 3 is a schematic diagram illustrating an exemplary instruction frame 300 according to an embodiment.

As can be seen in FIG. 3, the instruction frame 300 associated to a data link layer frame comprises information fields which contain metadata of the data link layer frame, including at least one of the following: a port number 301, a network type 303, an ingress frame timestamp 305, a frame length 307, a frame priority 309, a number of rules matched, matching numbers of the matched rules 313, one or more commands, a command length 315 and one or more command parameters 317a-c, as well as a command checksum 319.

In summary, embodiments of the invention enable: a device and method targeting the construction of an automotive gateway electronic control unit (ECU) based on hardware/software codesign and driven by a standardized set of predefined but parameterizable/configurable coarse-grained functional building blocks to exploit hardware parallelism and pipeline strategies; a novel system architecture targeting networking product (from switch to router to gateway) and its breakdown in functional blocks, implementable in both System-on-Chip (SoC) and Field-Programmable Gate Array (FPGA) devices; design of a new design methodology able to fulfill/balance an extensive set of networking requirements and networking disciplines at the same time, mostly Functional Safety, Cyber Security and Time Sensitive Networking (TSN).

Furthermore, embodiments of the invention also provide a new set of building blocks to compose a Lego-like networking system, wherein every building block can synthesize one or more functions: from data encryption/decryption, to data integrity check (CRC), to TSN (802.1AS, 802.Qci, 802.Qbv, 802.1CB) to rules-based filtering, firewall and network intrusion detection system (NIDS), to signal or PDU gatewaying, transport protocol data packet encapsulation and aggregation (e.g., IEEE 1722), etc.

In this regard, every coarse-grained building block has a set of configurable aspects (e.g., number of ingress/egress ports, memory geometry and size of the queues, bus width, pipeline stages, operation clock frequency, etc.), and each one of these primitives is developed in silicon, is configurable and can be instantiated in a System-on-Chip device to compose the communication gateway unit. Through a fully automated process, embodiments of the invention allow for a fully functional communication gateway unit by selecting and interconnecting the different functional blocks to compose a control and data path with the set of selected configurable features as well as the set of protocol/functions supported and aligned with the software defined network (SDN) architecture. Every processing stage of the full data path of a gateway device is configurable, from ingress ports to egress ports.

As aforementioned, embodiments of the invention provide a gateway architecture that is oriented to exploit both hardware parallelism and pipelining strategies, based on a sequential and ultrafast ingress-to-egress data path.

Figure 4:
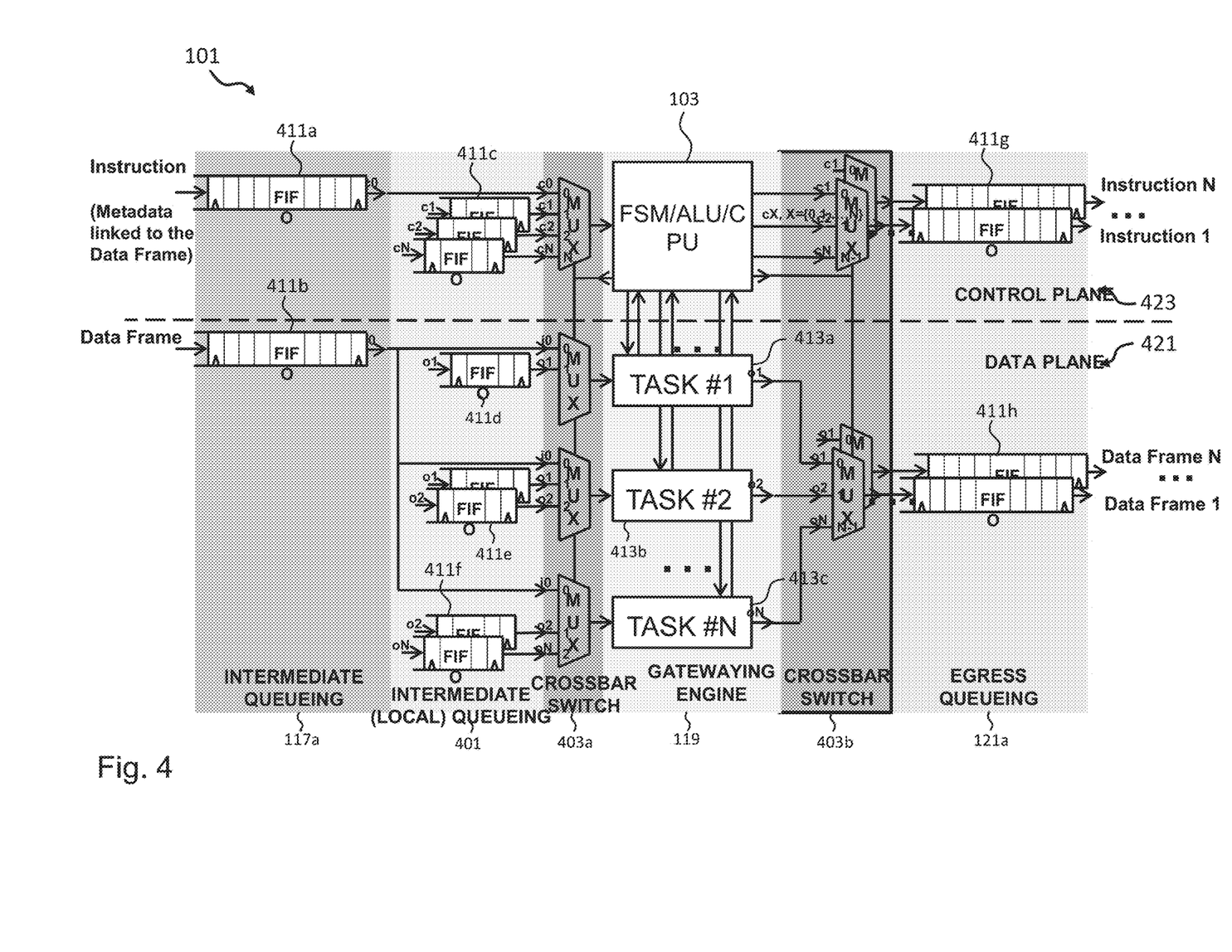
FIG. 4 is a schematic diagram of the gatewaying part of an exemplary network device 101 illustrated as an automotive gateway electronic control unit according to an embodiment, wherein data processing paths are implemented in parallel and/or in a pipeline between ingress ports and egress ports.

FIG. 4 is a schematic diagram of the gatewaying part of an exemplary network device 101 which is illustrated as an automotive gateway electronic control unit (ECU) according to an embodiment, wherein the data processing paths are implemented in parallel and/or in a pipeline between ingress ports and egress ports in this embodiment.

As can be taken from a detailed view in FIG. 4, the network device 101 comprises a central processing unit 103, one or more crossbar switches 403a-b and a plurality of co-processors including: an intermediate queuing co-processor 117a, an intermediate local queuing co-processor 401, a gatewaying co-processor 119, and an egress queuing co-processor 121.

In order to buffer data frames at different stages of their data processing paths, according to an embodiment, the intermediate queuing co-processor 117a, the intermediate local queuing co-processor 401 and the egress queuing co-processor 121a comprise at least a memory 411a-h such as a FIFO memory configured to buffer data frames.

In an embodiment, the central processing unit 103 is configured to communicate with the plurality of co-processors for implementing a control path through which it is possible to exchange instruction frames. Moreover, each data frame which moves internally across the network device 101, is processed by the plurality of co-processors from a data plane 421, while, in its turn, in parallel and at the same time, its associated instruction frame is handled from a control plane 423, moving from one coprocessor stage to the next coprocessor stage synchronously to the movement, back and forth, of its related data link layer frame.

During both the filtering and policing as well as gatewaying stages, there are an extensive set of processing tasks. All these processing tasks allocated in each of these co-processors can be processed in parallel and/or in pipelining.

As seen in FIG. 4, there are a set of functional blocks (Tasks #1 . . . #N) 413a-c that can be interconnected in parallel or in pipeline depending on the handling of the crossbar switches 403a-b inside. In an embodiment, the feedback path or closed-loop connection from gateway output to gateway input for instance observing how the output of Task #2 (o2) 413b can be reinjected to the intermediate local queue co-processor to be processed again in Task #2 or in Task #N.

In an embodiment, the instruction frame is generated and moved synchronously with each data frame in each of the processing stages, from ingress port to egress port, and this is the way to instruct every functional block about the processing task that needs to be performed for each particular data frame.

Figure 5:
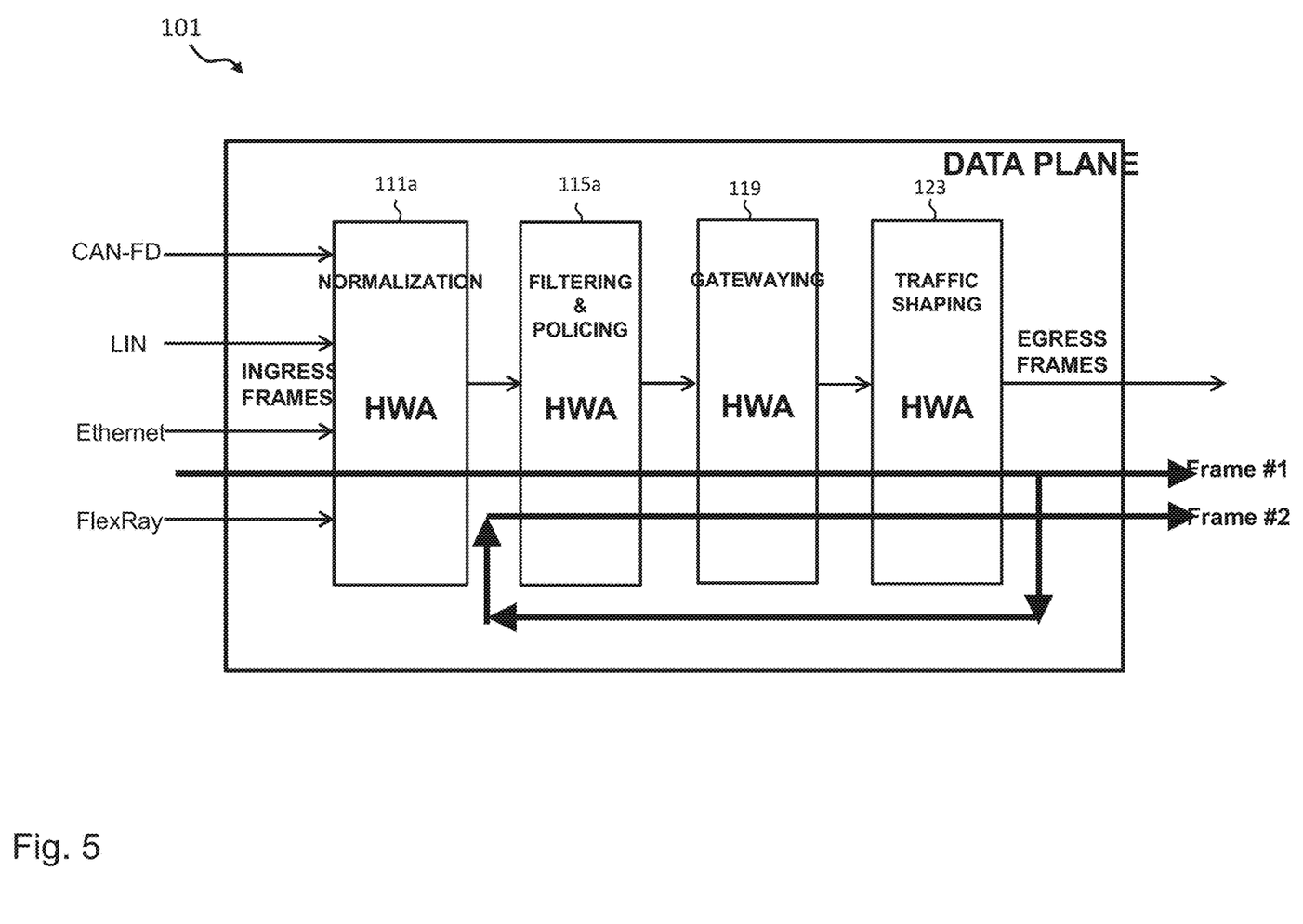
FIG. 5 is a schematic diagram of an exemplary network device 101 illustrated as an automotive gateway electronic control unit according to an embodiment, wherein data processing paths comprise iterations at different stages of processing.
Figure 6:
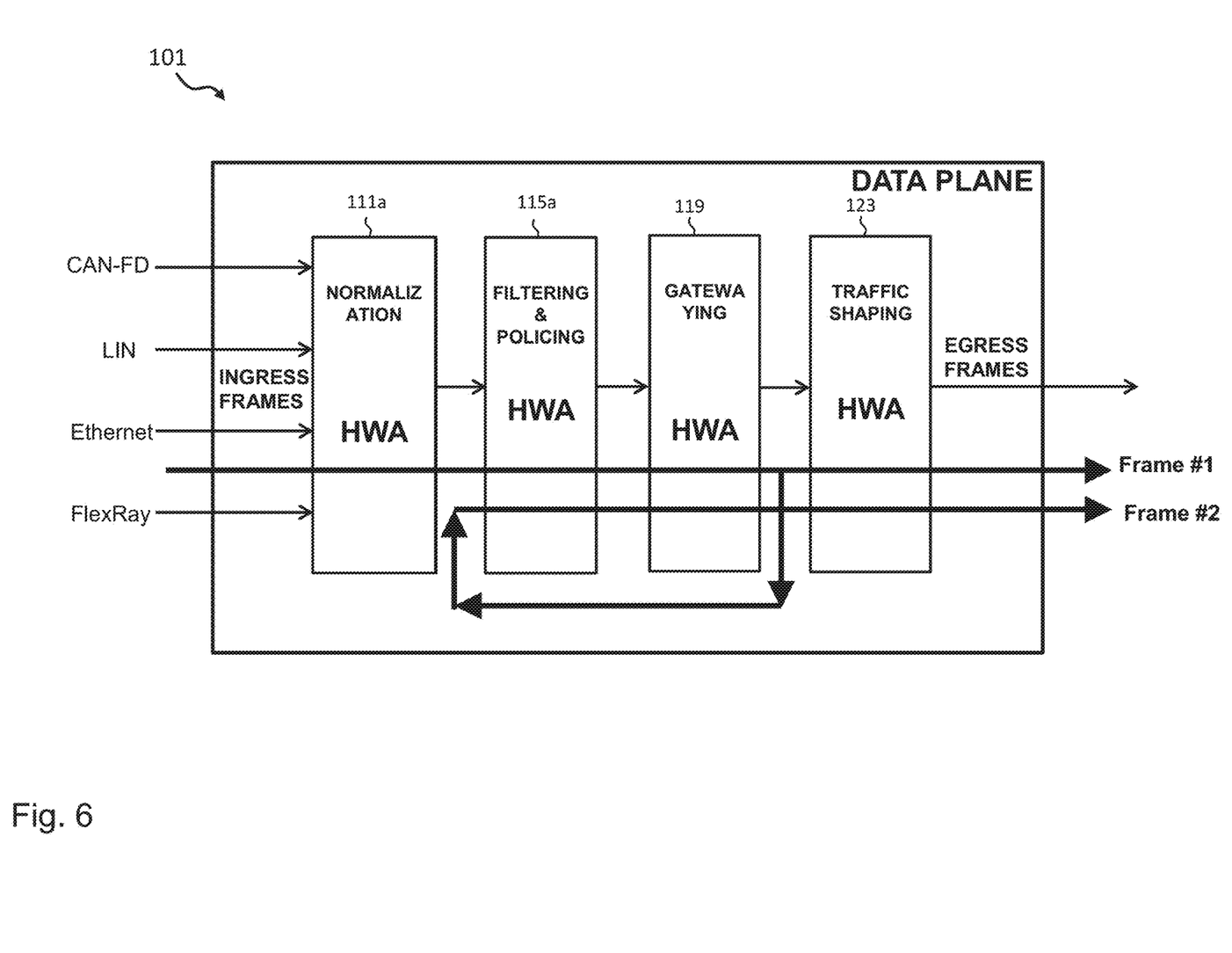
FIG. 6 is a schematic diagram of an exemplary network device 101 illustrated as an automotive gateway electronic control unit according to an embodiment, wherein data processing paths comprise iterations at different stages of processing.

Apart from the direct ingress-to-egress processing, the network device 101 also allows iterations with different stages of processing as shown in FIG. 5 and FIG. 6, aimed at exploiting and optimizing thus the reuse of hardware co-processors when possible and/or needed.

FIG. 5 and FIG. 6 show an exemplary network device 101 which is illustrated as an automotive gateway electronic control unit (ECU) according to an embodiment, wherein a closed-loop data path goes from the traffic shaping stage 123 (output) to the ingress queueing stage (input) as shown in FIG. 5, and wherein a closed-loop data path goes from the gatewaying stage 119 (output) to both the ingress queueing and egress queueing (inputs) stages as shown in FIG. 6.

As seen from FIG. 2, a data frame provided by the traffic shaping co-processor 123 is forwarded to egress ports, and/or back to an intermediate queueing co-processor, and/or back to an ingress queueing co-processor.

As seen from FIG. 2, a data frame provided by the gatewaying co-processor 119 is forwarded to an egress queueing co-processor, and/or back to an intermediate queueing co-processor, and/or back to an ingress queueing co-processor.

The above embodiments allow in this way to continue the processing of the resultant gatewaying frame across further processing tasks allocated either into the filtering and policing stage 115a or in the gatewaying stage 119 or in the traffic shaping stage 123. This iterative process is there because some ingress frames can probably require more than one action to be performed on them. Such architectural closed loop enables the deployment of pipelining strategies across these blocks and also internally to these blocks through the different hardware functions or tasks allocated there.

Figure 7:
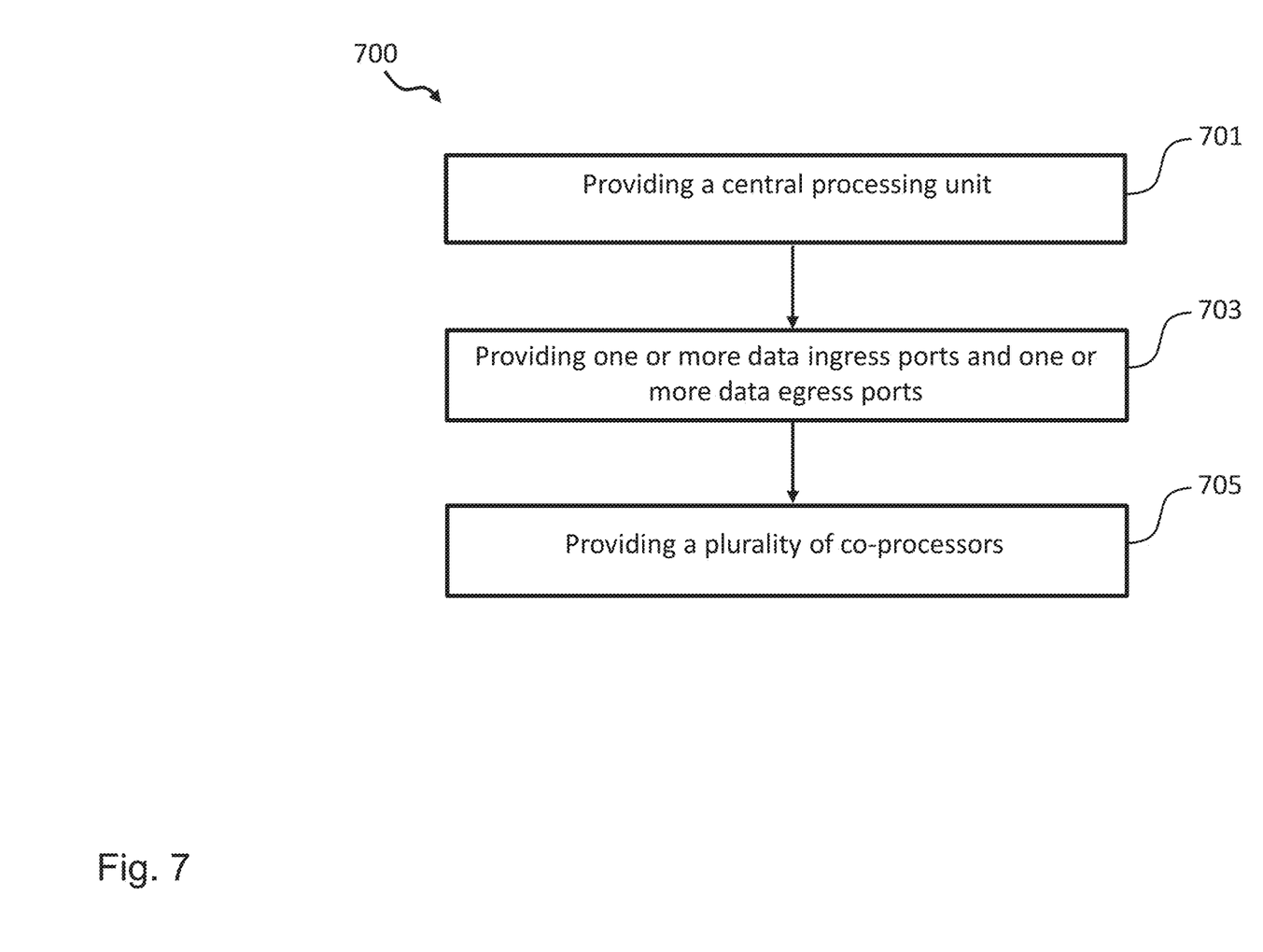
FIG. 7 is a flow diagram illustrating a method 700 of providing a network device for switching, routing and/or gatewaying data among different subnetworks of a communication network.

FIG. 7 is a flow diagram illustrating a method 700 of providing a network device for switching, routing and/or gatewaying data among different subnetworks of a communication network. The method 700 comprises the following steps: a step 701 of providing a central processing unit; a step 703 of providing one or more data ingress ports and one or more data egress configured to exchange data with a further network device of the communication network; and a step 705 of providing a plurality of co-processors, wherein the plurality of co-processors comprises one or more frame normalization co-processors, one or more ingress queuing co-processors, one or more filtering and policing co-processors, one or more intermediate queuing co-processors, at least one gatewaying co-processor, one or more egress queuing co-processors and at least one traffic shaping co-processor, wherein the central processing unit is responsible for configuring and controlling the one or more data ingress ports, the one or more data egress ports and the plurality of co-processors to implement one or more data processing paths in parallel and/or in pipeline between the one or more ingress ports and the one or more egress ports.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

The invention claimed is:

1. A network device for switching, routing, or gatewaying data among different subnetworks of a communication network, the network device comprising:
   at least one central processing unit;
   one or more data ingress ports and one or more data egress ports configured to exchange data with a further network device of the communication network; and
   a software-defined network (SDN) architecture configured to implement one or more data processing paths between at least one of the one or more data ingress ports and at least one of the one or more data egress ports, each of the one or more data processing paths routed through at least one of a plurality of co-processors in accordance with requirements of an electronic control unit (ECU), the architecture comprising:
   the plurality of co-processors, wherein the plurality of co-processors comprises one or more frame normalization co-processors, one or more ingress queueing co-processors, one or more filtering and policing co-processors, one or more intermediate queueing co-processors, at least one gatewaying co-processor, one or more egress queueing co-processors and at least one traffic shaping co-processor, a functionality of each of the plurality of co-processors is implemented in either a system-on-chip or a field-programmable gate array device
   wherein the one or more data processing paths are implemented in parallel or in a pipeline between the at least one of the one or more data ingress ports and the at least one of the one or more data egress ports, the data processing paths implemented by connecting or removing interconnections between the one or more data ingress ports, the plurality of co-processors, and the one or more data egress ports.

2. The network device of claim 1, wherein the one or more data ingress ports and the one or more data egress ports are based on heterogeneous network technologies including one or more of LIN, CAN 2.0, CAN-FD, CAN-XL, FlexRay, 10Base-T1S, 100Base-T1, 100Base-T, 1000Base-T1, 1000Base-T, or 10GBase-T.

3. The network device of claim 1, wherein a data link layer frame provided by the one or more filtering and policing co-processor is forwarded to the one or more intermediate queueing co-processors or back to the one or more ingress queueing co-processors.

4. The network device of claim 1, wherein a data link layer frame provided by the at least one gatewaying co-processor is forwarded to the one or more egress queueing co-processors, or back to the one or more intermediate queueing co-processors, or back to the one or more ingress queueing co-processors.

5. The network device of claim 1, wherein a data link layer frame provided by the at least one traffic shaping co-processor is forwarded to the one or more data egress ports, or back to the one or more intermediate queueing co-processors, or back to the one or more ingress queueing co-processors.

6. The network device of claim 1, wherein the network device is an automotive gateway ECU.

7. A method of providing a network for switching, routing, or gatewaying data among different subnetworks of a communication network, the method comprising:

providing a central processing unit;

providing one or more data ingress ports and one or more data egress ports configured to exchange data with a further network device of the communication network;

providing a plurality of co-processors, wherein the plurality of co-processors comprises one or more frame normalization co-processors, one or more ingress queuing co-processors, one or more filtering and policing co-processors, one or more intermediate queuing co-processors, at least one gatewaying co-processor, one or more egress queuing co-processors, and at least one traffic shaping co-processor, a functionality of each of the plurality of co-processors is implemented in either a system-on-chip or a field-programmable gate array device; and providing a software-defined network (SDN) architecture configured to implement one or more data processing paths between at least one of the one or more data ingress ports and at least one of the one or more data egress ports, each of the one or more data processing paths routed through at least one of the plurality of co-processors in accordance with requirements of an electronic control unit (ECU), the architecture comprising the one or more data ingress ports, the one or more data egress ports, and the plurality of co-processors, wherein the one or more data processing paths are implemented in parallel or in pipeline between the at least one of the one or more data ingress ports and the at least one of the one or more data egress ports, the data processing paths are implemented by connecting or removing interconnections between the one or more data ingress ports, the plurality of co-processors, and the one or more data egress ports.

* * * * *